(12) United States Patent
Monfray et al.

(10) Patent No.: US 9,735,707 B2
(45) Date of Patent: Aug. 15, 2017

(54) THERMAL ENERGY HARVESTING OPTIMISATION WITH BISTABLE ELEMENTS AND COLLABORATIVE BEHAVIOR

(71) Applicants: COMMISSARIAT A L'ENERGIE ATOMIQUE ET AUX ENERGIES ALTERNATIVES, Paris (FR); STMICROELECTRONICS (CROLLES 2) SAS, Crolles (FR)

(72) Inventors: Stéphane Monfray, Eybens (FR); Guillaume Savelli, Grenoble (FR); Thomas Skotnicki, Crolles-Monfort (FR); Philippe Coronel, Barraux (FR); Frédéric Gaillard, Voiron (FR)

(73) Assignees: Commissariat a L'Energie Atomique et aux Energies Alternatives, Paris (FR); STMicroelectronics (Crolles2) SAS, Crolles (FR)

( * ) Notice: Subject to any disclaimer, the term of this patent is extended or adjusted under 35 U.S.C. 154(b) by 567 days.

(21) Appl. No.: 14/356,717

(22) PCT Filed: Nov. 8, 2012

(86) PCT No.: PCT/EP2012/072160
§ 371 (c)(1),
(2) Date: Sep. 11, 2014

(87) PCT Pub. No.: WO2013/068477
PCT Pub. Date: May 16, 2013

(65) Prior Publication Data
US 2015/0022054 A1    Jan. 22, 2015

(30) Foreign Application Priority Data

Nov. 9, 2011   (FR) ...................... 11 60209

(51) Int. Cl.
*H02N 10/00* (2006.01)
*H02N 2/18* (2006.01)

(52) U.S. Cl.
CPC ................ *H02N 2/18* (2013.01); *Y10T 29/42* (2015.01)

(58) Field of Classification Search
CPC .......... H02N 2/18; H02N 3/00; H02N 11/002; F03G 7/065
(Continued)

(56) References Cited

U.S. PATENT DOCUMENTS 6,812,820 B1    11/2004  Fouillet
8,232,858 B1 *   7/2012  Garcia .................. B81B 3/0024
                                                337/333
(Continued)

FOREIGN PATENT DOCUMENTS

EP    1323668 B1    7/2003
EP    2309560 B1    4/2011
(Continued)

*Primary Examiner* — Hanh Nguyen
(74) *Attorney, Agent, or Firm* — Slater Matsil, LLP

(57) ABSTRACT

System for converting thermal energy into electrical energy (S1) intended to be arranged between a hot source (SC) and a cold source (SF), comprising means for converting thermal energy into mechanical energy (6) and a piezoelectric material, with the means for converting thermal energy into mechanical energy (6) comprising groups (G1, G2) of at least three bimetallic strips (9, 11, 13) linked mechanically together by their longitudinal ends and suspended above a substrate (12), each bimetallic strip (9, 11, 13) comprising two stable states wherein it has in each of the states a curvature, with two directly adjacent bimetallic strips (9, 11, 13) having for a given temperature opposite curvatures, with
(Continued)

the switching from one stable state of the bimetallic strips (9, 11, 13) to the other causing the deformation of a piezoelectric material.

26 Claims, 6 Drawing Sheets

(58) Field of Classification Search
USPC .......................... 310/307, 306, 332, 339, 340
See application file for complete search history.

(56) References Cited

U.S. PATENT DOCUMENTS

| | | | |
|---|---|---|---|
| 8,773,003 B2* | 7/2014 | Skotnicki | H02N 2/18 310/306 |
| 8,878,418 B2* | 11/2014 | Descure | H02N 2/18 310/306 |
| 2004/0150298 A1 | 8/2004 | Styblo et al. | |
| 2006/0278263 A1 | 12/2006 | Kim et al. | |
| 2010/0295655 A1* | 11/2010 | Pannek | B60C 23/041 340/3.1 |
| 2011/0083714 A1 | 4/2011 | Descure | |
| 2011/0095646 A1* | 4/2011 | Skotnicki | H02N 2/18 310/306 |
| 2015/0115769 A1 | 4/2015 | Savelli | |

FOREIGN PATENT DOCUMENTS

| | | |
|---|---|---|
| JP | 2003211397 | 7/2003 |
| WO | 02084754 | 10/2002 |
| WO | 2006062275 | 6/2006 |

\* cited by examiner

THERMAL ENERGY HARVESTING OPTIMISATION WITH BISTABLE ELEMENTS AND COLLABORATIVE BEHAVIOR

TECHNICAL FIELD AND PRIOR ART

This invention provides a system for converting thermal energy into electrical energy.

Electronic circuits, when they are operating, produce heat. This heat is not used and must be removed in order to avoid deteriorating the circuits. Other sources of heat are also present in our environment, such as for example conduits, exhaust, the walls of industrial machines, etc., of which the heat given off is not used.

It is considered to recover this heat in order to convert it into electrical energy.

It is for example considered to use bimetallic strips, the latter are formed of two strips of different metals, materials or alloys with different coefficients of expansion, flexible, welded or glued to one another, in the lengthwise direction. Due to the different coefficients of expansion of the two strips, the bimetallic strip are deformed with a large amplitude when it is heated as well as when it is cooled. When it is heated, the latter switches from a substantially flat shape to a shape having a certain curvature. The orientation of the curvature depends on the temperature to which it is subjected, and the initial properties of the material (thickness, coefficients of thermal expansion, etc.). This deformation is converted into electrical energy by a transducer, for example a piezoelectric material which is deformed or shocked when the bimetallic strip becomes curved. The energy transmitted to the piezoelectric material, and therefore the energy recovered are not optimal.

There are also preformed bimetallic strips that have a first and a second stable state according to the temperature they are subjected to. In each of the stable states, they have a curvature or deformation, with the curvatures or deformations of the two stable states being opposite in most cases. These bimetallic strips are also designated as "blistering bimetallic strips". When such bimetallic strips are heated and switch from a first stable state to a second stable state, this is referred to as "blistering", and when the bimetallic strips are cooled, and switch from the second stable state to the first stable state, this is referred to as unblistering. During the blistering and the unblistering, a large quantity of energy is released.

DESCRIPTION OF THE INVENTION

The purpose of this invention is to offer a system for converting thermal energy into electrical energy with improved efficiency.

The purpose mentioned hereinabove is achieved by a system for converting thermal energy into electrical energy comprising a transducer of mechanical energy into electrical energy and at least one convertor of thermal energy into mechanical energy, with the convertor comprising at least two preformed bimetallic strips linked mechanically in series and having opposite and controlled curvatures. The bimetallic strips can be manufactured from a single piece.

In other terms, preformed bimetallic strips are associated in opposition in such a way that the blistering of one participates in the unblistering of the other, as such reducing the energy required for the blistering or unblistering of each of the bimetallic strips, as such increasing the switching frequency of each of the bimetallic strips.

The bimetallic strips operate in a collaborative manner, which makes it possible to increase the electrical energy recovered.

The subject-matter of the invention is then a system for converting thermal energy into electrical energy intended to be arranged between a hot source and a cold source, comprising a substrate, means for converting thermal energy into mechanical energy and means for converting mechanical energy into electrical energy, with the means for converting thermal energy into mechanical energy comprising at least one group of at least two bimetallic strips linked mechanically together and suspended at least partially above the substrate, with each bimetallic strip comprising two stable states wherein they have in each of the states a curvature, with directly adjacent bimetallic strips having opposite curvatures, with the switching from one stable state of the bimetallic strips to the other being adapted to cause an excitation of the means for converting mechanical energy into electrical energy and a generation of electricity.

In an embodiment, the bimetallic strips are linked mechanically together by their longitudinal ends in such a way as to form a band.

In another embodiment, the bimetallic strips are linked mechanically together by their lateral ends.

In another embodiment, the bimetallic strips are connected to bimetallic strips by their longitudinal ends and to bimetallic strips by their lateral ends in such a way as to form a blanket of bimetallic strips.

Advantageously, the bimetallic strips are made of a single piece. And more advantageously, in the case where the system comprises several groups of at least two bimetallic strips, said groups are made from a single piece.

More preferably, the group of bimetallic strips comprises an odd number of bimetallic strips.

In an embodiment, the means for converting mechanical energy into electrical energy comprise a piezoelectric material. The piezoelectric material is then more preferably arranged directly on at least one bimetallic strip.

In another embodiment, the means for converting mechanical energy into electrical energy comprise a magnetic material. The magnetic material can then be deposited on at least one bimetallic strip, and the system comprises electrical contacts on the bimetallic strip in order to recover the electricity generated in the bimetallic strip.

Advantageously, each bimetallic strip is covered by a transducer made of piezoelectric material or of magnetic material.

In another embodiment, the means for converting mechanical energy into electrical energy is of the capacitive type.

Advantageously, at least one bimetallic strip of the group is, in one of its stable states, in contact with the substrate improving the thermal contact.

Another subject-matter of the invention is an assembly for converting thermal energy into electrical energy comprising a hot source and a cold source located facing one another and a system for converting according to the invention, said system for converting being arranged between the hot source and the cold source. The hot source is for example thermally supplied by an electronic system.

Another subject-matter of the invention is a method of carrying out a system for converting according to the invention, comprising the steps of:

a) depositing a layer of silicon oxide on a substrate made of silicon, b) carrying out portions made of $Si_3N_4$ or SiN on the layer of oxide, c) thermal growth of the oxide between the portions made of $Si_3N_4$, d) carrying out bimetallic strips by depositing a first layer of metal or of a semi-conductor and of a second layer of metal, with the two metals having different coefficients of expansion, e) carrying out means for converting mechanical energy into electrical energy, f) removing the oxide in the discrete zones in such a way as to form cavities between the substrate and the layers of metal.

The step e) can comprise the depositing of a piezoelectric material on the layers of metal, which is for example PZT.

The step c) consists for example in a local oxidation of the silicon.

During the step d), the first layer of metal can be polycrystalline silicon and the second layer of metal can be aluminium.

BRIEF DESCRIPTION OF THE DRAWINGS

This invention shall be better understood using the following description and the drawings wherein.

DETAILED DESCRIPTION OF PARTICULAR EMBODIMENTS

Figure 1A:
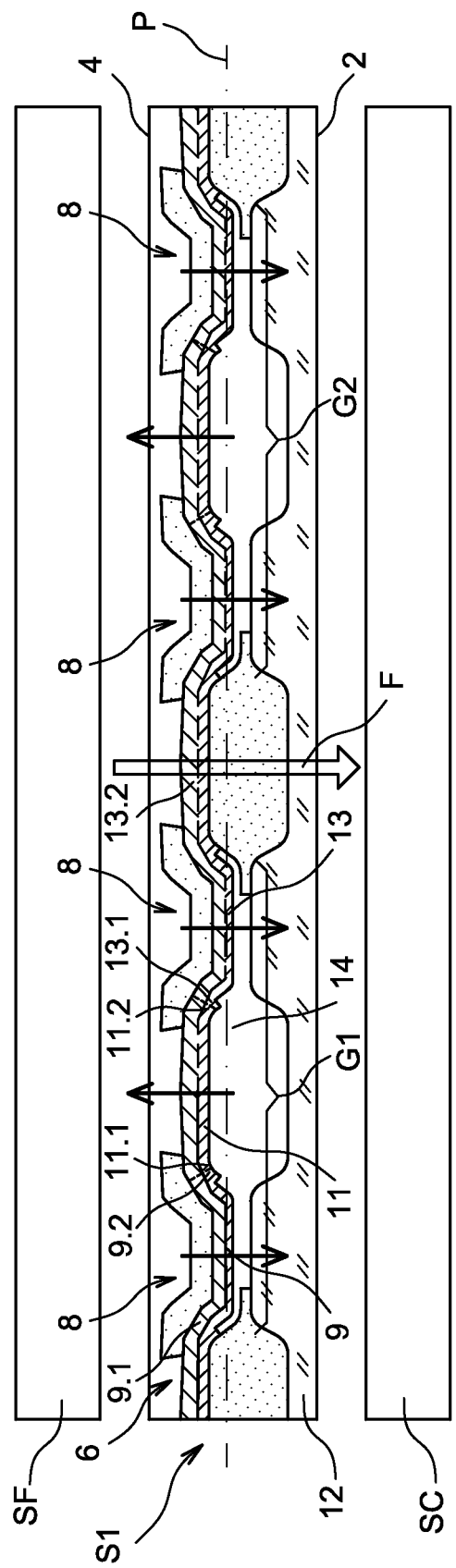
FIGS. 1A and 1B are views of the sides of an embodiment of a system for converting according to the invention in two states.
Figure 1B:
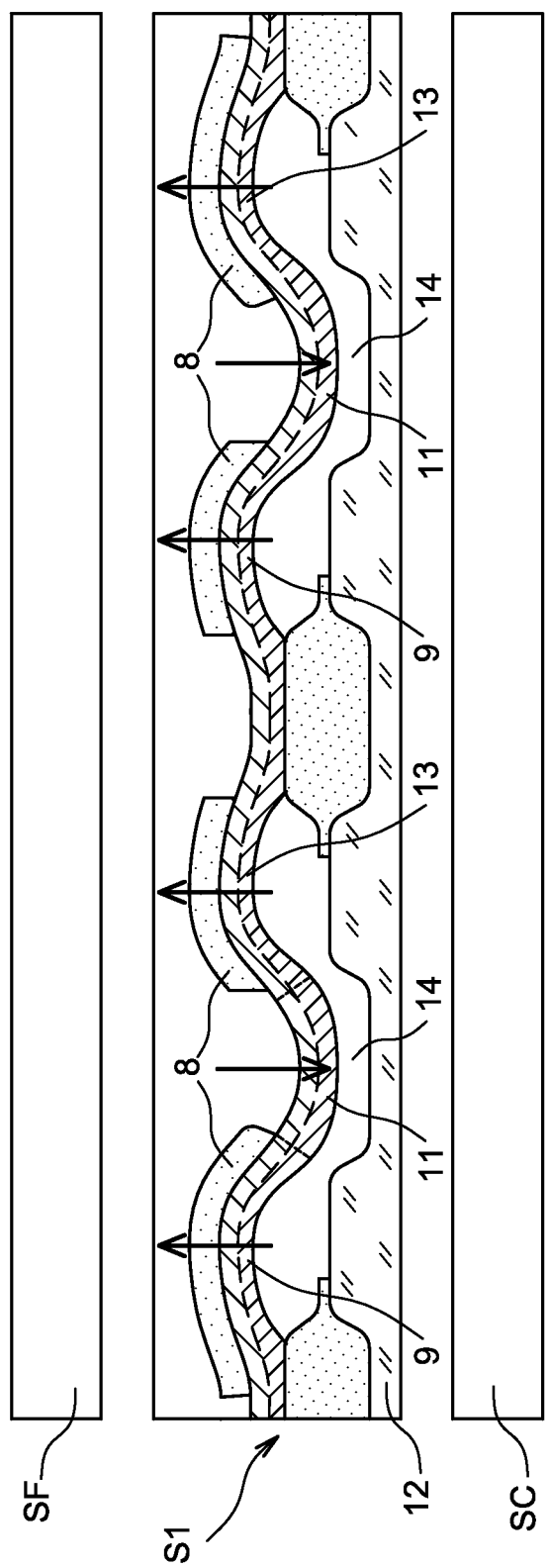

In the FIGS. 1A and 1B, an embodiment is shown of a system for converting thermal energy into electrical energy according to the invention. In the rest of the description, the system S1 for converting thermal energy into electrical energy shall be designated by "system S1" for the purposes of simplicity.

The system S1 is intended to be arranged between a hot source SC, for example a surface of an electronic component or of any other source of heat, and a cold source SF, for example a fin radiator or directly the ambient air.

The system S1 extends substantially according to a plane P and comprises a first surface 2 facing or in contact with the hot source SC and a second surface 4 facing or in contact with the cold source SF, with the surfaces 2, 4 being arranged on either side of the plane P. The system S1 is then subjected to a thermal gradient symbolised by the arrow F substantially perpendicular to its surfaces 2, 4.

The system comprises means for converting thermal energy into mechanical energy 6 and means for converting mechanical energy into electrical energy 8, referred to as a transducer.

The transducer or transducers 8 can be formed, for example, by a piezoelectric material, by means of the capacitive type or by magnetic means.

In the example shown, the means for converting thermal energy into mechanical energy 6 comprise groups G1, G2 of three preformed and blistering bimetallic strips 9, 11, 13 arranged side by side and linked mechanically, with directly adjacent bimetallic strips the curvatures if which being opposite, as can be seen in FIGS. 1A and 1B. Each bimetallic strip 9, 11, 13 comprises two longitudinal ends 9.1, 9.2, 11.1, 11.2, 13.1, 13.2. The bimetallic strips are linked mechanically together by their longitudinal ends in such a way as to form bands of bimetallic strips. In the example shown, the bimetallic strips are in direct contact by their longitudinal ends. The groups G1 and G2 form bands suspended above a substrate 12 by their ends, with bimetallic strips able to be freely deformed under the effect of the temperature.

The substrate 12 comprises hollows 14 above which the bands are suspended.

Advantageously, the three bimetallic strips 9, 11, 13 are made from a single piece. More advantageously, all of the groups are made from a single piece, which simplifies the manufacture of the system and improves the robustness of the system.

Alternatively, it can be considered, in particular for large-size systems, to carry out the bimetallic strips separately and then render them integral via welding.

As was indicated hereinabove, a bimetallic strip is formed of two strips of a different metal or alloy having different coefficients of expansion, with the two strips being made integral par rolling, welding, gluing or directly by depositing for example by the direct spraying of a second material on a first material as shall be described in detail in the rest of the description, in such a way as to form a monolithic element. As such when one of the strips expands, the bimetallic strip will become curved. When the bimetallic strip is heated, it switches from a first configuration to a second configuration, this change is designated as "blistering" and, when it cools down, it return to its first configuration, this change is designated as "unblistering". More preferably, each band comprises an odd number of bimetallic strips, with the bands having a plane of symmetry, which simplifies the manufacture as shall be shown in what follows.

The means for converting thermal energy into mechanical energy can comprise groups of two bimetallic strips, or of more than three bimetallic strips without leaving the scope of this invention. The number of bimetallic strips per band is selected in such a way that the band does not bend under its own weight. Furthermore, the system extends more preferably in a plane and comprises a plurality of bands distributed over a surface along lines and according to several parallel lines.

Furthermore, the means for converting can comprise any number n of groups of bimetallic strips, n being an integer greater than or equal to 1. The number of groups can be selected according to the size of the system. In the case of micrometric-size systems a large number of groups can be carried out.

In the example of FIGS. 1A and 1B, the system comprises transducers formed by a piezoelectric material arranged in such a way as to be deformed by the blistering and unblistering of the bimetallic strips.

In the example shown, the piezoelectric material is formed by portions of layers of piezoelectric material directly deposited on the bimetallic strips. In addition, in the example shown, the piezoelectric material is not deposited on all of the bimetallic strips. More preferably, such a material is deposited on each bimetallic strip in order to increase the quantity of energy recovered. The piezoelectric material can also be positioned on either side of the bimetallic strip in order to maximise the production of electrical energy. More preferably, each bimetallic strip comprises its own transducer.

Contacts (not shown) are present on the piezoelectric material in order to collect the current produced and are connected either directly to a load, or to a device for storing the electricity produced. The transducers are connected in parallel. A system wherein all of the bimetallic strips are covered by a single layer of piezoelectric material does not leave the scope of this invention.

The bimetallic strips have for example a thickness between 0.5 μm and 200 μm. A length of a "band of bimetallic strips" can be between 10 μm and a few mm, in the case of an application to electronic components. The number of bimetallic strips per system implemented can be several tens to several thousands.

The operation of the system for converting S1 shall now be explained.

For example, initially the system is in the state shown in FIG. 1A. The bimetallic strips 9, 13 are curved on the side of the hot source while the bimetallic strip 11 is curved on the side of the cold source SF.

Under the effect of the heat given off by the hot source SC, one of the strips of each of the bimetallic strips 9 and 13 expands. When the latter are sufficiently expanded the bimetallic strips 9, 13 blister and their curvature is inverted and has the configuration of FIG. 1B. Simultaneously, the bimetallic strip 11 which is on the side of the cold source SF, tends to be deformed in the inverse configuration. When the two bimetallic strips 9, 13 blister, the bimetallic strip 11 due to the blistering of the bimetallic strips 9, 13, is driven. As such the bimetallic strip 11 can unblister before it has stored the required energy, its unblistering is facilitated.

This change in configuration of the bimetallic strips has for effect to directly deform the piezoelectric material, which causes an appearance of a charge within the material and therefore the generation of an electrical current.

As such, the bimetallic strips connected mechanically assist each other mutually, the energy required for a change in the configuration is therefore reduced, which has for effect to increase the switching frequency of the bimetallic strips and therefore the number of deformation cycles of the piezoelectric material, the electrical energy collected is therefore increased.

It is of course understood that the bimetallic strip 11 can blister or unblister before the bimetallic strips 9 and 13.

The bimetallic strips of the same band or of the same system can have different forms and/or be made with different materials and as such react to different temperatures, which can be interesting according to the configuration of the hot source and that of the cold source.

Advantageously, the bimetallic strips are chosen, more particularly the materials of the strips of the bimetallic strips, in such a way that the two transition temperatures causing the blistering and the unblistering of the bimetallic strips are close together so that the bimetallic strips have a blistering/unblistering frequency that is even higher and as such causes the piezoelectric element to vibrate with a high frequency.

Moreover, the portions of the piezoelectric material that cover the bimetallic strips can be made of different piezoelectric materials.

In the case where the transducer is of the capacitive type, it can be considered that each bimetallic strip carries a plate facing a fixed plate, with the two plates being separated by a dielectric medium. The two plates then form a variable capacitor. The change in the configuration of each bimetallic strip causes the variation in the capacity of the capacitors. It can be considered that the bimetallic strips directly form one of the plates of the capacitors.

Figure 2:
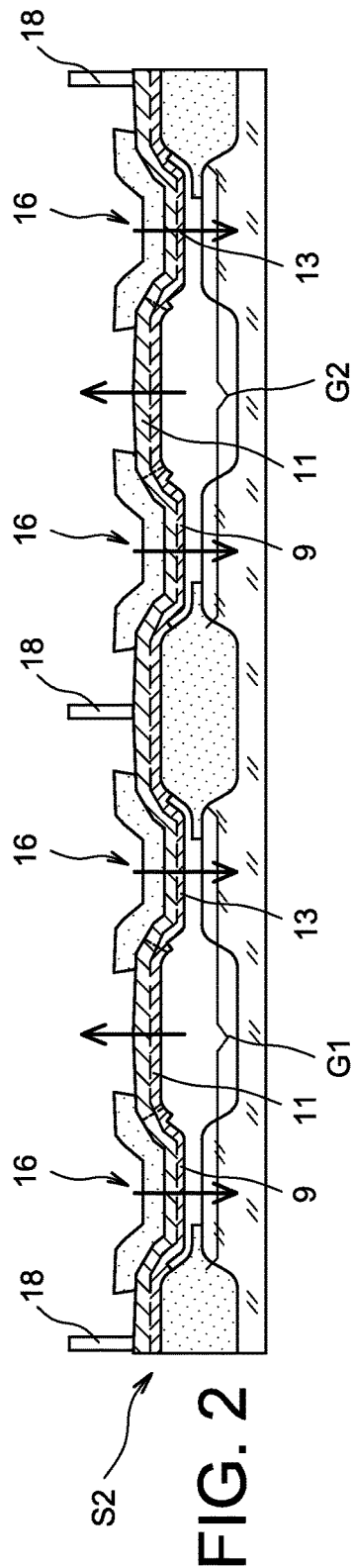
FIG. 2 is a side view of another embodiment of a system for converting implementing means for converting mechanical energy into electrical energy of the magnetic type.

FIG. 2 shows an embodiment of a system S2 implementing magnetic transducers. The bimetallic strips are covered with a magnetic material 16 that generates a fixed magnetic field. Electrical contacts 18 are directly formed at the ends of the bands of bimetallic strips that form electrical conductors. The change in the configuration of the bimetallic strips, and therefore the deformation of the electrical conductors, cause the generation of a current according to the Lorentz Force Law.

Figure 4A:
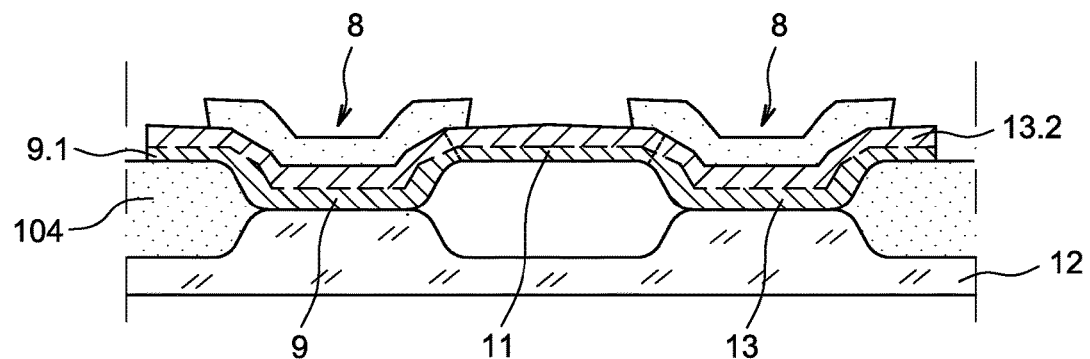
FIG. 4A is a side view of an alternative embodiment of a system for converting wherein the bimetallic strips are in contact with the substrate in one of their stable states.

FIG. 4A shows an alternative embodiment wherein the bimetallic strips 9 and 13 are, in a stable state, in direct thermal contact with the substrate, and the bimetallic strip 11 is in thermal contact with the substrate in the other stable state which improves the responsiveness of the system and its output.

Figure 4B:
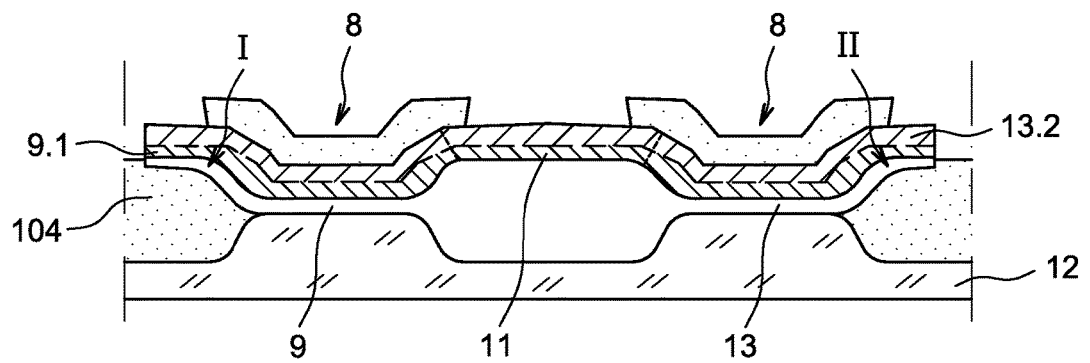
FIG. 4B is a side view diagramming a step of carrying out the system of FIG. 4A.

FIG. 4B diagrammatically shows a step of the method of the system of FIG. 4A. This step consists in engraving a layer of oxide 104 on a greater thickness in the zones I and II under the longitudinal ends 9.1, 13.2 of the bimetallic strips 9 and 13 are suspended, in such a way as to cause a lowering of the position of the band of bimetallic strips until entering into contact with the substrate.

The embodiments described are not in any case limiting and any other arrangement can be suitable. An arrangement in the form of a matrix does not leave the scope of this invention. Each bimetallic strip, excluding those located on the edge of the matrix, would then be linked mechanically to a bimetallic strip at each of its longitudinal ends and at each of its lateral ends.

An example of a method for carrying out a system for converting according to the invention implementing a piezoelectric material in relation with FIGS. 3A to 3F shall now be described. This method is of the type of that implemented in microelectronics and makes it possible to carry out systems particularly suited for converting thermal energy generated by electronic systems.

Figure 3A:
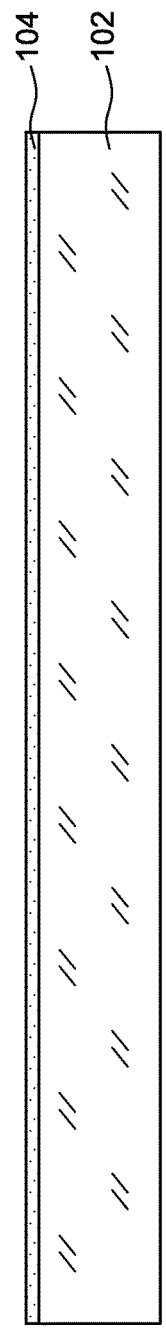
FIGS. 3A to 3F are diagrammatical views of the steps of carrying out the system of FIGS. 1A and 1B according to an example of the method of carrying out.

On a substrate 102, for example made of silicon, a layer 104 of $SiO_2$ is deposited. The element as such obtained is shown in FIG. 3A. Alternatively, it could be TEOS (Tetraethoxysilane).

During a following step a deposit of $Si_3N_4$ is carried out on the layer of oxide 104. Alternatively it could be SiN. The portions 106 of $Si_3N_4$ are delimited by lithography and engraving. The element obtained as such is shown in FIG. 3B.

Figure 3B:
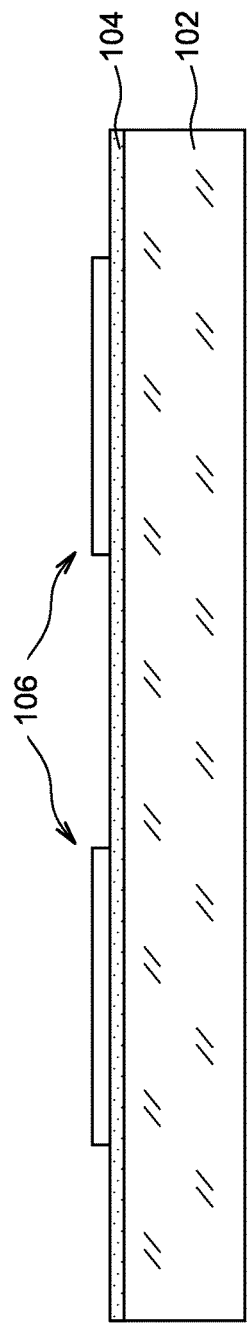
Figure 3C:
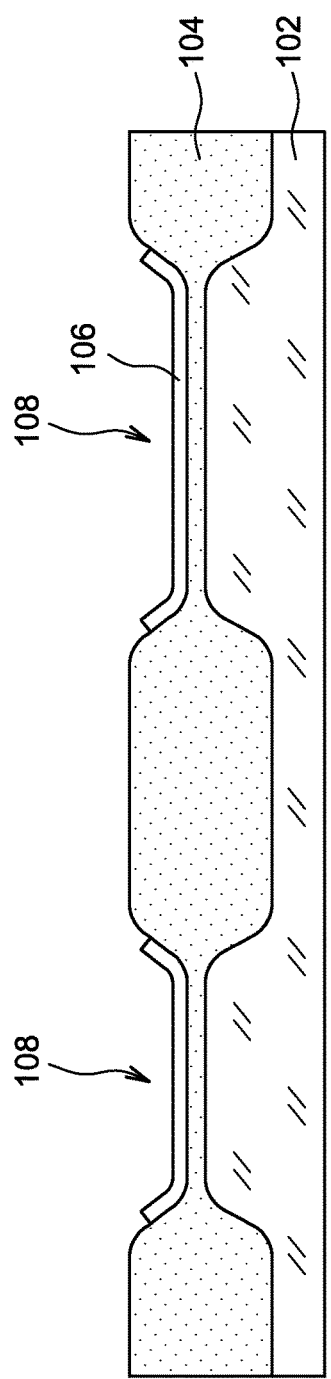

Then a thermal oxidation of the element of FIG. 3B is carried out, for example via the method of local oxidation of silicon (LOCOS) which is well known to those skilled in the art. This method consists in applying very high temperatures for example between 700° C. and 1300° C. to the element arranged in an oxygen-rich atmosphere, which causes an increase in the thickness of the layer of oxide between the zones covered by the portions of $Si_3N_4$. There is the formation of cups 108 on the surface of the element shown in FIG. 3C.

Figure 3D:
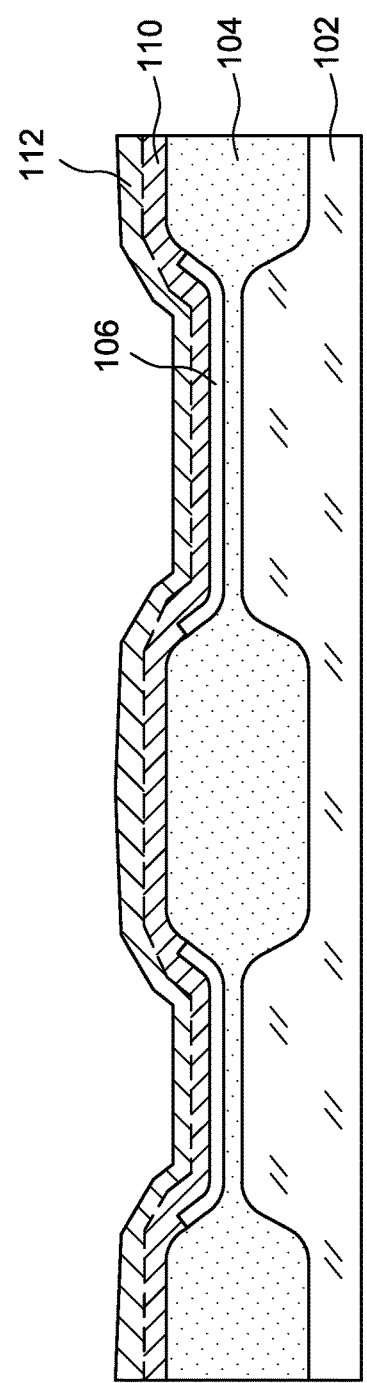

During a following step, a depositing of a layer 110 of a first metal or metal alloy, for example polycrystalline silicon is carried out and then a depositing of a layer of a second metal or metal alloy 112, for example aluminium. The two metals have different coefficients of thermal expansion. Alternatively, the second metal could be Ti, Tin, Cu, Au, FeNi, Ni, W, Pt, Ta, TaN, etc. Then via lithography and engraving with stopping on the oxide, the bimetallic strips 9, 11, 13 are delimited. The element obtained as such is shown in FIG. 3D. The bimetallic strips carried out as such are directly preformed and have a curvature. Furthermore, they are directly linked mechanically by their longitudinal ends since they are made of a single piece.

Figure 3E:
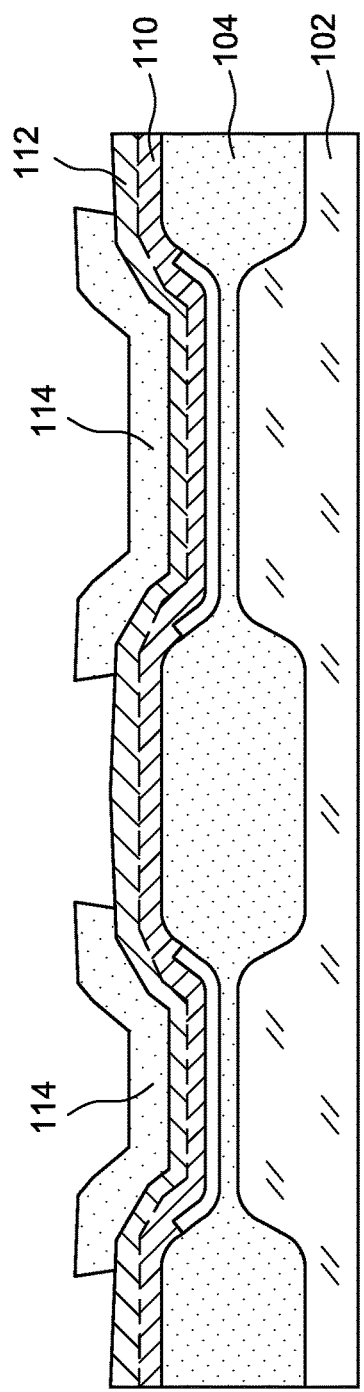

During a following step, a depositing of a layer 114 of piezoelectric material is carried out, for example of PZT (lead zirconate titanate), or AlN, or ZnO. The portions of piezoelectric material 114 above the bimetallic strips carried out in the preceding step are then delimited by lithography and engraving. The element obtained as such is shown in FIG. 3E.

Figure 3F:
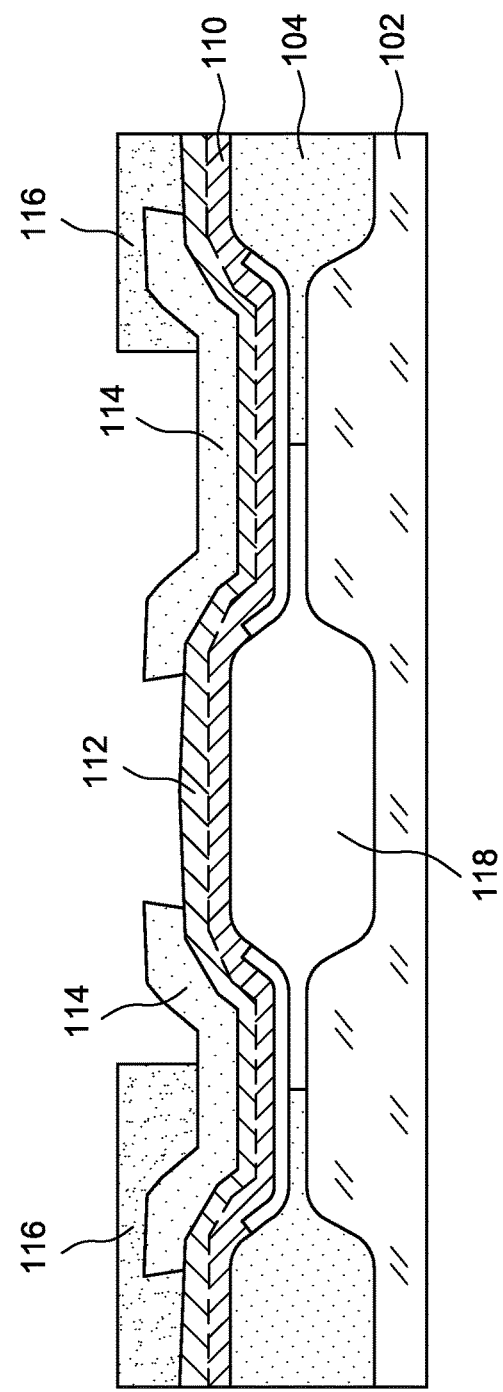

During a following step, the oxide is removed partially in such a way as to release the bimetallic strips, thus forming cavities under the bimetallic strips. For this, a resin mask 116 is carried out par lithography, in order to delimit the location of discrete cavities and then an engraving over time is then carried out for example with diluted hydrofluoric acid, as such forming the discrete cavities 118. The metal layers then comprise suspended portions forming the bands of bimetallic strips. The surface of the cavities is determined in such a way that an integer of bimetallic strips is released. The element obtained as such is shown in FIG. 3F.

More preferably, the bimetallic strips are released as an odd number, with the strips of bimetallic strips having a plane of symmetry that facilitates the manufacture of the system for converting.

Finally, the mask 116 is removed. The element obtained as such is shown in FIG. 1A.

In the case where the means for converting mechanical energy into electrical energy are of the magnetic type, it is provided for example to deposit a magnetic material instead of the piezoelectric material and to carry out contacts directly on the bimetallic strips.

The system can be of any size, it can have millimetric, micrometric and even nanometric dimensions to the dimensions of a magnitude of 1 metre to several metres.

The system for converting thermal energy into electrical energy offers improved output as the frequency of blistering-unblistering of the bimetallic strips is increased, as well as the production of electricity.

This system makes it possible for example to make use of the heat given off by a surface of a printed circuit chip, by an exhaust pipe of a motor vehicle or by the sun or by any other source of heat.

The invention claimed is:

1. A conversion system for converting thermal energy into electrical energy to be arranged between a hot source and a cold source, comprising:
a substrate;
means for converting thermal energy into mechanical energy; and
means for converting mechanical energy into electrical energy, the means for converting thermal energy into mechanical energy having at least one group of at least two bimetallic strips mechanically connected to one another and at least partially suspended above the substrate, each bimetallic strip having two stable states in which it has in each stable state a curvature, the bimetallic strips being directly adjacent having opposite curvatures, a passage from one stable state to the other being adapted to cause excitation of the means for converting mechanical energy into electrical energy for electricity generation.

2. The conversion system according to claim 1, wherein the bimetallic strips are mechanically interconnected by their longitudinal ends so as to form a band.

3. The conversion system according to claim 1, wherein the bimetallic strips are mechanically interconnected by their lateral ends.

4. The conversion system according to claim 1, wherein the bimetallic strips are connected to their longitudinal ends by bimetal and the bimetallic strips with their lateral ends so as to form a bimetallic sheet.

5. The conversion system according to claim 1, wherein the bimetallic strips are integrally formed.

6. The conversion system according to claim 1, wherein the bimetallic strips comprise a plurality of groups for at least two bimetallic strips, said plurality of groups being integrally formed.

7. The conversion system according to claim 6, wherein each group comprises an odd number of bimetallic strips.

8. The conversion system according to claim 1, wherein the means for converting mechanical energy into electrical energy comprises a piezoelectric material.

9. The conversion system according to claim 8, wherein the piezoelectric material is disposed directly on at least one bimetallic strip, and further comprising electrical contacts on the piezoelectric material.

10. The conversion system according to claim 1, wherein each bimetallic strip is covered by a piezoelectric transducer material.

11. The conversion system according to claim 1, wherein the means for converting mechanical energy into electrical energy comprises a magnetic material.

12. The conversion system according to claim 11, wherein the magnetic material is deposited on at least one bimetallic strip, and further comprising electrical contacts coupled to the bimetallic strip.

13. The conversion system according to claim 1, wherein the means for converting mechanical energy into electrical energy are of a capacitive type.

14. The conversion system according to claim 1, wherein at least one bimetallic strip when in one of its stable states is in contact with the substrate.

15. A thermal energy assembly comprising:
a hot source and a cold source; and
a conversion system for converting thermal energy into electrical energy arranged between the hot source and the cold source, comprising
a substrate,
means for converting thermal energy into mechanical energy, and
means for converting mechanical energy into electrical energy,
the means for converting thermal energy into mechanical energy having at least one group of at least two bimetallic strips mechanically connected to one another and at least partially suspended above the substrate, each bimetallic strip having two stable states in which it has in each stable state a curvature, the bimetallic strips being directly adjacent having opposite curvatures, the passage from one stable state to the other being adapted to cause excitation of the means for converting mechanical energy into electrical energy for electricity generation.

16. The thermal energy assembly according to claim 15, wherein the hot source is thermally supplied by an electronic system.

17. A method of making a conversion system for converting thermal energy into electrical energy to be arranged between a hot source and a cold source and comprising a substrate, means for converting thermal energy into mechanical energy, and means for converting mechanical energy into electrical energy, the means for converting thermal energy into mechanical energy having at least one group of at least two bimetallic strips mechanically connected to one another and at least partially suspended above the substrate, each bimetallic strip having two stable states in which it has in each stable state a curvature, the bimetallic strips being directly adjacent having opposite curvatures, the passage from one stable state to the other being adapted to cause excitation of the means for converting mechanical energy into electrical energy, the method comprising:

a) depositing a silicon oxide layer on a silicon substrate;
b) forming portions of $Si_3N_4$ or SiN on the silicon oxide layer;
c) performing thermal oxide growth between the portions;
d) forming the bimetallic strips by depositing a first layer of metal or semiconductor and a second layer of metal thereon, the first layer and the second layer having different coefficients of expansion;
e) forming the means for converting mechanical energy into electrical energy; and
f) removing of the silicon oxide layer in discrete zones so as to form cavities between the substrate and the first and second layers.

18. The method according to claim 17, wherein step e) includes depositing a piezoelectric material layer on the second layer.

19. The method according to claim 17, wherein step c) is performed by a local oxidation of silicon.

20. The method according to claim 17, wherein in step d), the first layer comprises polycrystalline silicon and the second layer comprises aluminum.

21. A conversion system for converting thermal energy into electrical energy to be arranged between a hot source and a cold source, comprising:
a substrate;
a transducer adapted to convert mechanical energy into electrical energy; and
at least one group of at least two bimetallic strips mechanically connected to one another and at least partially suspended above the substrate, each bimetallic strip having two stable states in which it has in each stable state a curvature, the bimetallic strips being directly adjacent having opposite curvatures, the passage from one stable state to the other being adapted to cause excitation of the transducer.

22. The conversion system according to claim 21, wherein the bimetallic strips are integrally formed.

23. The conversion system according to claim 21, wherein the bimetallic strips comprise a plurality of groups for at least two bimetallic strips, said plurality of groups being integrally formed.

24. The conversion system according to claim 21, wherein the transducer comprises a piezoelectric material.

25. The conversion system according to claim 21, wherein the transducer comprises a magnetic material.

26. The conversion system according to claim 21, wherein the transducer is of a capacitive type.

* * * * *